United States Patent [19]

Ritchie

[11] Patent Number: 5,230,479
[45] Date of Patent: Jul. 27, 1993

[54] METHOD FOR ATTACHING WEB TO A SPOOL AND RESULTING SPOOLED WEB

[75] Inventor: Shawn W. Ritchie, Rochester, N.Y.

[73] Assignee: Eastman Kodak Company, Rochester, N.Y.

[21] Appl. No.: 786,657

[22] Filed: Nov. 1, 1991

[51] Int. Cl.$^5$ .............................. B65H 75/28
[52] U.S. Cl. ...................................... 242/74
[58] Field of Search ................. 242/74, 71.1, 71.2

[56] References Cited

U.S. PATENT DOCUMENTS

| | | | |
|---|---|---|---|
| 2,541,476 | 2/1951 | Mihalyi | 242/74 X |
| 2,571,796 | 10/1951 | Ulmschneider et al. | 242/74 X |
| 2,900,868 | 8/1959 | Gaffney | 242/74 |
| 3,021,085 | 2/1962 | Freer et al. | 242/74 |
| 3,196,034 | 7/1965 | Pandolfo | 242/74 X |
| 3,300,156 | 1/1967 | Tucker et al. | 242/74.1 |
| 3,361,380 | 1/1968 | Mizutani | 242/74 |
| 3,485,690 | 12/1969 | Kozai | 242/74 X |
| 3,756,528 | 9/1973 | Ohmura | 242/74 |
| 4,173,315 | 11/1979 | Clausser | 242/74 |

Primary Examiner—John M. Jillions
Attorney, Agent, or Firm—Clyde E. Bailey

[57] ABSTRACT

A method of attaching film web 10 having a remaining portion 12 and a trailing end portion 18 to a spool 24 is disclosed. The method of attachment comprises forming a necked down portion 20 terminating in an axially extending flap 22 on trailing end portion 18 of film web 10. Moreover, the method of the invention comprises forming an adhesive member 34 comprising a central portion 36 for securely attaching to a seat 32 on elongated core 26 of spool 24, a first end portion 38 for securely attaching to one side of trailing end portion 18 of film web 10 such that first end portion 38 does not extend beyond necked down portion 20, and a second end portion 40 for securely attaching to the opposite side of said trailing end portion 18 beyond necked down portion 20 on non-image area 16 of film web 10. Additionally, the method of the invention is practiced by flexibly attaching adhesive member 34 to spool 24 and film web 10. the final step in the method of the invention is wrapping remaining portion 12 of film web 10 onto the edges of shoulders 28,30 of elongated core 26 so that remaining portion 12 of film web 10 overlies remaining portions 10 wrapped on shoulders 28,30 and trailing end portion 18 sandwiched between adhesive member 34 wraps onto seat 32 on elongated core 26 overlying adhesive member 34 wrapped onto seat 32.

16 Claims, 3 Drawing Sheets

METHOD FOR ATTACHING WEB TO A SPOOL AND RESULTING SPOOLED WEB

FIELD OF THE INVENTION

This invention relates generally to attaching webs to spools and, more particularly, to attaching photographic film web using an improved film to spool attachment and a method for making such an attachment.

BACKGROUND OF THE INVENTION

Many methods and structures are known for attaching the end of a web to a spool or hub upon which the web is wound. These methods have the following known disadvantages: (1) they require intricate parts in addition to the web such as spring clips for releasably securing the web end to the hub; (2) they present a difficult assembly problem necessitating special equipment for releaseably securing the end of the web to the hub; or, (3) they are complicated and expensive manufacturing methods. Moreover, in some instances the fastening methods and photographic film assembled thereby are not as reliable or dependable as desired, resulting in the web being prematurely released from the hub. Also, in film web which is attached with tape to a spool, objectionable pressure marks across the film have been known to occur during spooling because the successive convolutions of the film are deformed as they pass over the ridge formed by the attachment tape. A conventional automatic web winding equipment including a process of forming a tape portion and affixing it to the web and a spool automatically are disclosed in U.S. Pat. Nos. 2,940,232 and 4,903,907, incorporated herein by reference. Although only sometimes do pressure marks occur in the image area of film, experience indicates that any scratches or marks in the image area may result in crystallization of the silver halide constituent and consequently marring of exposure frames. Some photographers may, however, notice the pressure marks in a non-image area of the film and be concerned that some pressure marks also have occurred in the image area. A further disadvantage of tape attachment of photographic film is that the attachment sometimes has low and variable strength which is attributed to shear separation of the tape from the film. For example, attachment strength of 35 mm film is generally known to vary between 10 and about 60 pounds. In manufacturing, film rolls with low attachment strength tend to be difficult to spool. Moreover, low attachment strength film may result in inadvertent separation of film from the spool by the film user.

U.S. Pat. No. 3,021,085 discloses a method of attaching a film web to a hub having a recess fastening means for receiving the tapered end of the film web. Means for preventing pressure marks in the exposure portion of the film are not taught or suggested.

SUMMARY OF THE INVENTION

It is, therefore, an object of the invention to provide a method of attaching a web to a hub or spool that produces superior attachment strength.

Another object of the invention is to provide a method of attaching 35 mm photographic film web to a spool such that pressure marks in the film are eliminated.

Yet another object of the invention is to provide a photographic film roll with superior film to spool attachment strength.

Still another object of the invention is to provide a film roll wherein attachment strength variability has been eliminated by a tape to tape bond.

Accordingly, for accomplishing these and other objects of the invention, there is provided a method of attaching a web having a trailing end portion and a remaining portion to a spool having a core and enlarged support members on either end of the core for separating web portions on the core from web portions on the shoulders. The steps of the present method comprise first forming an axially extending flap on the trailing end portion of the web. Forming an adhesive member having a first end portion for securely attaching to the trailing end portion of the web such that the first end portion does not extend beyond the trailing end portion, a central portion for securely attaching to the core of the spool and a second end portion for securely attaching to the opposite side of the trailing end portion on the remaining portion of the web. Flexibly attaching the adhesive member to the spool and web. Finally, wrapping the remaining portion of the web onto the edges of the enlarged support members of the core so that only remaining portions of the web are on the enlarged support members and the trailing end portion sandwiched between the first and second portions of the adhesive member wrapped onto the core overlies the central portion of the adhesive member attached to the core. In this embodiment, no part of the remaining portion of the web on the support members of the spool overlies ridges of the adhesive member, thus reducing the possibility of pressure marks appearing in the web.

Accordingly, an important advantage of the invention is that pressure marks are not introduced in the remaining portion of the web because of the spatial separation of the remaining portion wrapped onto the shoulders of the core from the adhesive member and trailing end portion wrapped onto the core of the spool.

Another important advantage of the invention is it results in a photographic film roll having low variability in the web to spool attachment strength.

BRIEF DESCRIPTION OF THE DRAWING

The foregoing as well as other objects, features and advantages of this invention will become more apparent from the following detailed description when taken in conjunction with the appended figures in which.

DETAILED DESCRIPTION OF THE DRAWING

Figure 1:
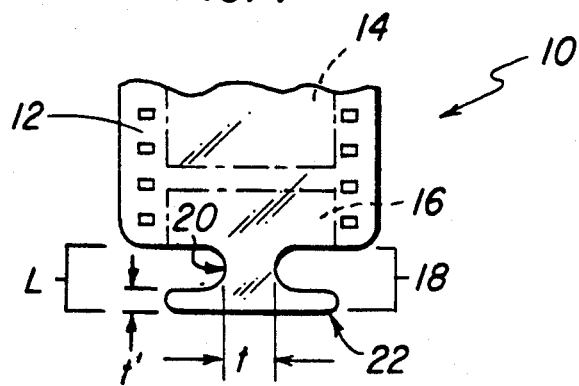
FIG. 1 shows a fragmentary plan view of the trailing end portion of a film web having the necked-down portion with an outwardly extending transverse or T-shaped flap.

Turning now to the drawings, and more particularly to FIG. 1 there is shown a fragmentary plan view of film web 10 of the present invention having a remaining portion 12 comprising an image area 14 and a non-image area 16 and, a trailing end portion 18. The image area 14 comprises exposure frames (not shown). The trailing end portion 18 has a centrally located, axially extending symmetrical necked-down portion 20 terminating in an outwardly extended transverse or T-shaped flap 22. Axial length L of the trailing end portion 18 is preferably 0.300 inches or 0.762 cm. For 35 mm photographic film, necked-down portion 18 has a thickness (t) in the range 0.25 to 0.70 inches (0.635 to 1.778 cm), although 0.550 inches (1.397 cm) is preferable. The thickness (t') of T-shaped flap 22 is preferably between 0.050 to 0.100 inches, (0.127 to 0.254 cm). The T-shaped flap 22 is preferred because it enables greater attachment strength and lower attachment strength variabilty as further described below. The T-shaped flap 22 also adds the required flexibility to web 10 during the spooling process. Other geometries for the axially extending flap 22 are also within the scope of the invention, such as an axially extending rectangular tab. The T-shaped flap 22 of the present invention or other suitable configuration, may be die cut, although those skilled in the art would readily recognize that other means for forming T-shaped flap 22, such as laser cutting, may be employed.

Figure 2:
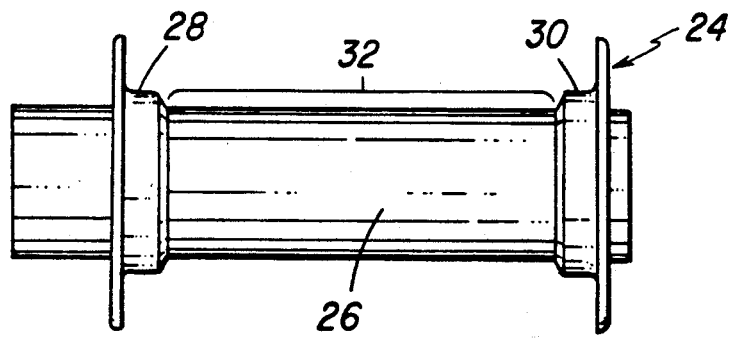
FIG. 2 shows an elevation view of a spool having shoulders for supporting the edges of the film web.

Turning next to FIG. 2, a 35 mm spool 24 for receiving a film web 10 is shown comprising an elongated core 26 bounded on either end by shoulders 28,30 of larger diameter than the elongated core 26. The enlarged shoulders 28,30 support the edges of remaining portion 12 of film web 10 (see FIG. 1) during spooling and form therebetween a seat 32 on elongated core 26 for receiving trailing end portion 18 of film web 10. The spool 24 is preferably plastic, although any suitable material, such as metal, may also be used.

Figure 3:
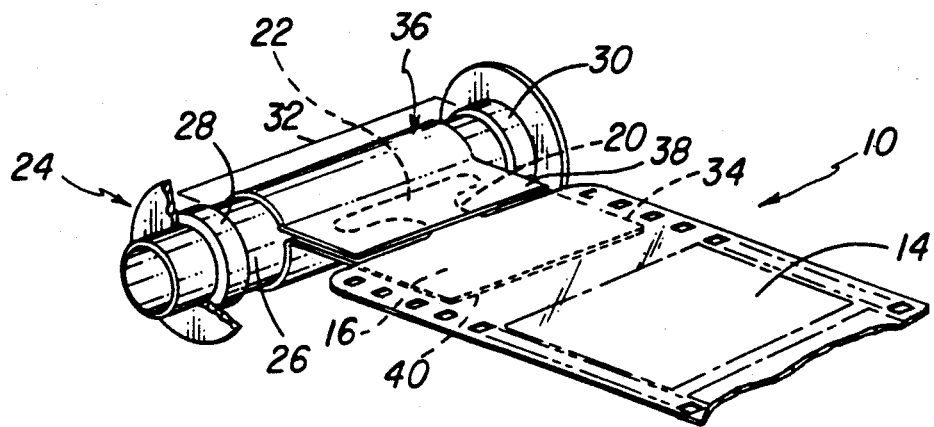
FIG. 3 shows a perspective view, partially broken away, of the adhesive member attached to the trailing end portion and the spool.

As shown in FIG. 3, an adhesive member 34, comprising a central portion 36, a first end portion 38 and a second end portion 40 is formed having a width less than both remaining portion 12 of film web 10 and seat 32, and greater than necked-down portion 20 and T-shaped flap 22 on trailing end portion 18 of film web 10. Preferably, adhesive member 34 is a pressure sensitive tape made of a latex impregnated paper material. The tape has an attachment strength of at least 10 lbs, although greater than about 20 lbs is preferable. T-shaped flap 22 enables film web 10 to spool 24 attachment strength to be limited by bonding of overlying adhesive member 34 and not by the relatively weak film web 10 to adhesive member 34 bonding forces as indicated by experiments. According to the test, the bonding of overlying adhesive member 34 on core 36 of spool 24 initiates at necked-down portion 20 as T-shaped flap 22 is trapped between necked down portion 22 and core 26. Film web 10 to spool 24 attachment strength is measured using the ANSI dynamic test method (PH1.14M—1983) which requires a tensile tester with a cross head speed of approximately 4 inches/minute (10.2 cm/min). Tape attachment strength of this magnitude has been experimentally determined to insure good tape adherence to spool 24 and overall improved film web 10 attachment strength. The adhesive member 34 is shown in FIG. 3 with first end portion 38 secured to one edge of one side of necked-down portion 20 of film web 10. The first end portion 38, shown clearly in FIG. 3, does not extend beyond the edge of T-shaped flap 22 onto remaining portion 12 of film web 10. Experiments indicate that film web 10 buckling occurs when first end portion 38 extends beyond the edge of T-shaped flap 22 onto remaining portion 12 of film web 10. Moreover, ridges of adhesive member 34 result from over extending first end portion 38 beyond T-shaped flap 22. These ridges are known to produce pressure marks in film web 10 during spooling. The central portion 36 of adhesive member 34 is shown wrapped around seat 32 of spool 24 and second end portion 40 of adhesive member 34 securely attached to the opposite side of trailing end portion 18 on non-image area 16 of film web 10.

Figure 5:
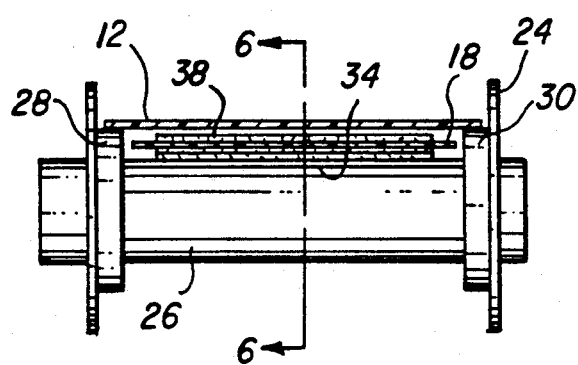
FIG. 5 shows a diagrammatical view of a photographic film roll constructed in accordance with the present invention.

In conventional film web spooling machines, such as described in U.S. Pat. No. 2,940,232, the tape is pulled from a roll by a measuring device, and is held on a vacuum box and chopped off to length. The vacuum box is then pivoted to apply the tape to the core of a film spool. Thus, a preferred method of attaching a film web 10 to a hub or spool 24, both as described above, in accordance with the present invention comprises the steps of:

forming an axially extending necked-down portion 20 terminating in an outwardly extended T-shaped flap 22 in trailing end portion 18 of film web 10 (as shown in FIG. 1);

forming an adhesive member 34 comprising a central portion 36, and first and second end portions 38,40, adhesive member 34 also having a width less than seat 32 of elongated core 26 and remaining portion 12 of film web 10 and wider than necked-down portion 20 of film web 10 and T-shaped flap 22 (as shown clearly in FIG. 3);

flexibly attaching adhesive member 34 to elongated core 26 of spool 24 such that first end portion 38 securely attaches to the edge of T-shaped flap 22 and does not extend beyond T-shaped flap 22 onto remaining portion 12 of film web 10, central portion 36 wraps at least partially around elongated core 26, and second end portion 40 attaches securely to the opposite side of necked-down portion 20 beyond T-shaped flap 22 on non-image area 16 of film web 10 (shown more clearly in FIG. 3); and wrapping remaining portion 12 of film web 10 around the edge of shoulders 28,30 of elongated core 26 spaced-apart from adhesive member 34, as shown in FIG. 5, so that image area 14 of film web 10 and adhesive member 34 do not come into frictional contact.

Figure 6:
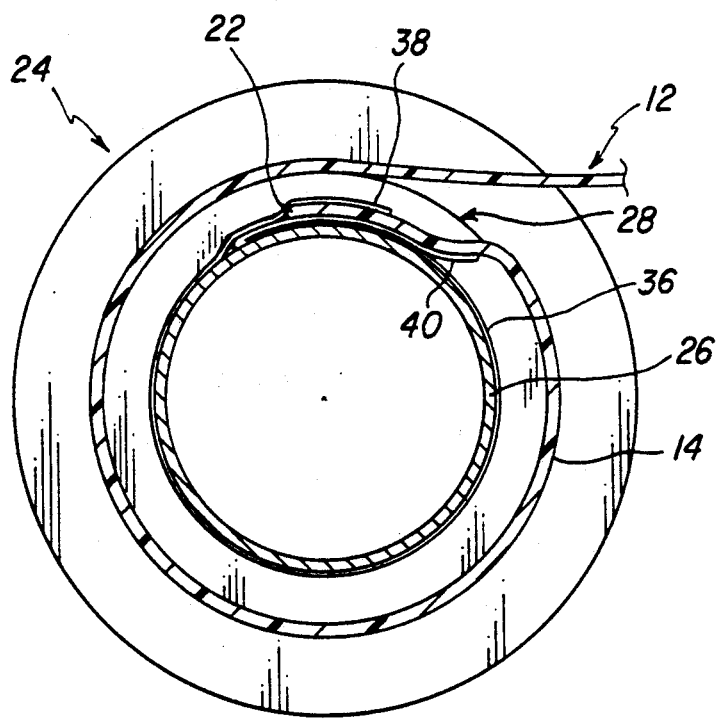
FIG. 6 shows a section along line 6—6 of FIG. 5.

In this embodiment, adhesive member 34 overlies only adhesive member 34 on elongated core 26 of spool 24 and not image area 14 of film web 10 which rides on shoulders 28,30 of spool 24. FIG. 6, a section view taken along the 5—5 line of FIG. 5, shows more clearly central portion 36 of adhesive member 34 wound onto elongated core 26 of spool 24 and T shaped flap 22 on trailing end portion 18 sandwiched between first and second end portions 38,40 of adhesive member 34.

Figure 7:
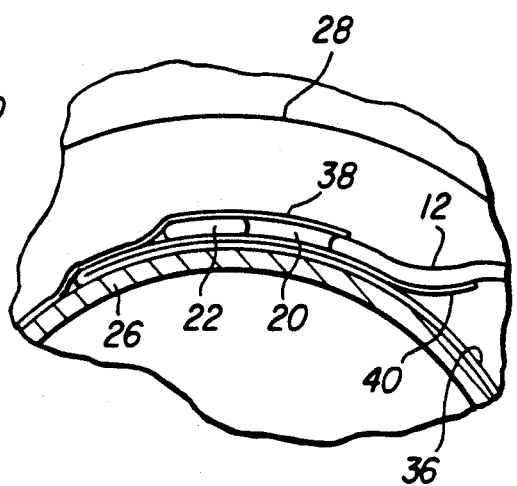
FIG. 7 is an enlarged fragmentary view of the film roll of FIG. 6 showing a web portion on the shoulders and tape portion on the core portion of the spool.

In FIG. 7, an enlarged fragmentary view of a portion of FIG. 6, shows T-shaped flap 22 sandwiched between first and second portions 38, 40 of adhesive member 34. First end portion 38 is shown extended to the edge of T-shaped flap 22 and not onto remaining portion 12 of film web 10. Experiments indicate that much needed flexibility is imparted to film web 10 by this latter arrangement and film web 10 buckling does not occur during spooling. Thus, the first convolution of film web 10 comprising image area 14 is shown in FIG. 6 (and an enlarged view in FIG. 7) separated from the core 26 and wound onto shoulder member 28 of spool 24. In this way, ridges of adhesive member 34 cannot easily interfere with film web 10 wrapped around shoulders 28,30 of spool 24 causing presure marks therein.

Figure 4:
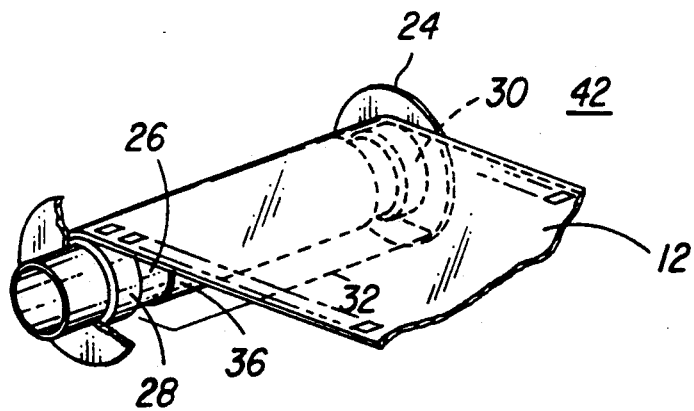
FIG. 4 shows a perspective view in partial section of the film web exposure portion riding on the shoulders of the spool and spatially separated from the adhesive member on the trailing end portion.

Thus, a preferred embodiment of a photographic film roll 42 of the present invention, as shown in FIG. 4, comprises:

a spool 24, as described above;

a film web 10, as described above;

an adhesive member 34, as described above, wherein first end portion 38 securely attaches to the outer edge of one side of T-shaped flap 22 (shown clearly in FIG. 3), central portion 36 wraps around seat 32 of elongated core 26 and second end portion 40 securely attaches to the opposite side of T-shaped flap 22 on non-image area 16 of remaining portion 12 of film web 10; and, wherein image area 14 of remaining portion 12 of film web 10 wraps around shoulders 28,30 of spool 24 spaced-apart from adhesive member 34 so that adhesive member 34 and image area 14 do not come into frictional contact, as shown more clearly in FIG. 5. The attachment strength, measured in the manner described above, of photographic film roll 42 of the present invention varies within the narrow range of from about 32 to 38 pounds.

Moreover, in accordance with another embodiment of the invention, a method of reducing pressure marks on the surface of a film web 10 attachable to a spool 24, both described above, the method comprising:

forming an axially extending necked-down portion 20 terminating in an outwardly extended, centrally located, symmetrical T-shaped flap 22 in trailing end portion 18 of film web 10 as shown in FIG. 1;

forming an adhesive member 34, as described above, having a width less than both remaining portion 12 of film web 10 and seat 32 and wider than necked-down portion 20 and T-shaped flap 22 of film web 10;

flexibly attaching adhesive member 34 to elongated core 26 of spool 24 such that first end portion 38 securely attaches to the edge of T-shaped flap 22 and does not extend beyond T-shaped flap 22 onto remaining portion 12 of film web 10, central portion 36 wraps at least partially around elongated core 26 of spool 24, and second end portion 40 attaches securely to the opposite side of necked-down portion 20 beyond T-shaped flap 22 on non-image area 16 of film web 10 (shown more clearly in FIG. 3); and wrapping remaining portion 12 of film web 10 around the edge of shoulders 28,30 of elongated core 26 spaced-apart from adhesive member 34 so that image area 14 of remaining portion 12 and adhesive member 34 do not come into frictional contact as shown in FIG. 5.

The invention has thus been described in detail with particular reference to preferred embodiments thereof, but it will be understood that variations and modifications can be effected within the spirit and scope of the invention.

What is claimed is:

1. A method of attaching a web having a trailing end portion and a remaining portion to a spool having a core and enlarged shoulders on either end of said core for separating web portions on said core from web portions on said shoulders, comprising:

a) forming an axially extending flap on said trailing end portion of said web, said flap being narrower than said web;

b) forming an adhesive member comprising a central portion for attaching to said core of said spool, a first end portion for attaching to said trailing end portion such that said first end portion does not extend beyond said trailing end portion, and a second end portion for attaching to the opposite side of said trailing end portion on said remaining portion of said web;

c) flexibly attaching said adhesive member to said spool and said web; and, d) wrapping said remaining portion of said web onto the edges of said shoulders of said core so that said remaining portion of said web overlies remaining portions wrapped on said shoulders and said trailing end portion sandwiched between said adhesive member wraps onto said core overlying said adhesive member wrapped onto said core.

2. The method recited in claim 1 wherein said axially extending flap is centrally located on said trailing end portion.

3. The method recited in claim 2 wherein said axially extending flap is T-shaped.

4. A method of attaching film web having a trailing end portion and a remaining portion, said remaining portion having an image area and a non-image area, to a spool having an elongated core bounded by shoulders, said shoulders and said elongated core forming a seat therebetween, and wherein the diameter of each of said shoulders is greater than the diameter of said elongated core, comprising the steps of:

a) forming a necked down portion terminating in an axially extending flap on said trailing end portion of said film web, said axially extending flap being narrower than said film web;

b) forming an adhesive member comprising a central portion for securely attaching to said seat on said elongated core, a first end portion for securely attaching to one side of said trailing end portion of said film web such that said first end portion does not extend beyond said necked down portion, and a second end portion for securely attaching to the opposite side of said trailing end portion beyond said necked down portion on said non-image area of said film web;

c) flexibly attaching said adhesive member to said spool and said film web; and d) wrapping said remaining portion of said film web onto the edges of said shoulders of said elongated core so that said remaining portion of said film web overlies remaining portions wrapped on said shoulders and said trailing end portion sandwiched between said adhesive member wraps onto said seat on said elongated core overlying said adhesive member wrapped onto said seat.

5. The method recited in claim 4 wherein said neck-down portion has a thickness from about 0.25 (0.635 cm.) to about 0.70 inches (1.778 cm.).

6. The method recited in claim 4 wherein said neck-down portion has a thickness of 0.550 inches (1.397 cm.).

7. A photographic film roll comprising:

a) a spool comprising an elongated core portion bounded by a pair of shoulders, said shoulders and said elongated core forming a seat therebetween, and wherein the diameter of each of said shoulders is greater than the diameter of said elongated core portion;

b) a film web comprising a remaining portion having a image area and a non-image area and a trailing end portion, said trailing end portion having a necked-down portion terminating in an axially extending flap, said axially extending flap having a width greater than said necked-down portion and of less width than said remaining portion;

c) an adhesive member comprising first and second end portions and a central portion, said adhesive member having a width less than both the width of said remaining portion and said seat and greater than said axially extending flap;

d) wherein said first end portion of said adhesive member securely attaches to one end of said necked down portion such that said portion does not extend beyond the edge of said necked down portion onto said remaining portion of said film web, said central portion of said adhesive member wraps around said seat of said spool and, said second end portion securely attaches to the opposite side of said remaining portion such that said second end portion does not extend onto said image area of said web thereby adhesively joining said film web flexibly to said spool; and, f) wherein said remaining portion of said film web is wound onto said shoulders of said spool spaced-apart from said adhesive member so that said remaining portion and adhesive member do not come into frictional contact.

8. The photographic film roll recited in claim 7 wherein said necked-down portion of said film web has a thickness from about 0.25 (0.635 cm.) to about 0.70 inches (1.778 cm).

9. The photographic film roll recited in claim 7 wherein said necked-down portion of said film web has a thickness of 0.550 inches (1.397 cm.).

10. The photographic film roll of claim 7 wherein said axially extending flap is T-shaped.

11. The photographic film roll recited in claim 7 wherein said axially extending flap is centrally located on said trailing end portion.

12. A method of reducing pressure marks on the surface of film web having a trailing end portion and a remaining portion, said remaining portion having an image area and a non-image area, said film web being attachable to a spool having an elongated core bounded by shoulders, said shoulders and said elongated core forming a seat therebetween, and wherein the diameter of each of said shoulders is greater than the diameter of said elongated core, comprising:

a) forming a necked down portion terminating in an axially extending flap on said trailing end portion of said film web, said axially extending flap being narrower than said film web;

b) forming an adhesive member comprising a central portion for securely attaching to said seat on said elongated core, a first end portion for securely attaching to one side of said trailing end portion of said film web such that said first end portion does not extend beyond said necked down portion, and a second end portion for securely attaching to the opposite side of said trailing end portion beyond said necked down portion on said non-image area of said film web;

c) flexibly attaching said adhesive member to said spool and said web; and, d) wrapping said remaining portion of said film web onto the edges of said shoulders of said elongated core so that said remaining portion of said film web overlies remaining portions wrapped on said shoulders and said trailing end portion sandwiched between said adhesive member wraps onto said seat on said elongated core overlying said adhesive member wrapped onto said seat.

13. The method recited in claim 12 wherein said necked-down portion of said film web has a thickness from about 025 (635 cm.) to about 0.70 inches (1.778 cm.).

14. The method recited in claim 12 wherein said necked-down portion has a thickness of 0.550 inches (1.397 cm).

15. The method recited in claim 12 wherein said axially extending flap is T-shaped.

16. The method recited in claim 12 wherein said axially extending flap is centrally located on said trailing end portion.

* * * * *